May 2, 1939.  B. H. ADLER  2,156,257
CHANGEABLE SIGN AND LETTERS THEREFOR
Filed April 24, 1936  3 Sheets-Sheet 1
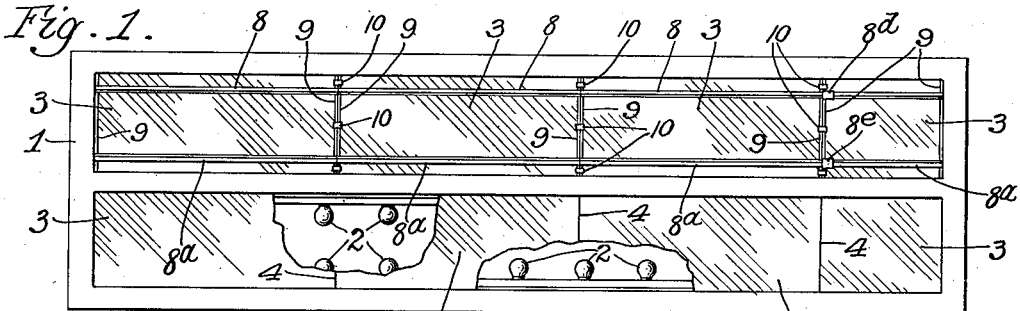
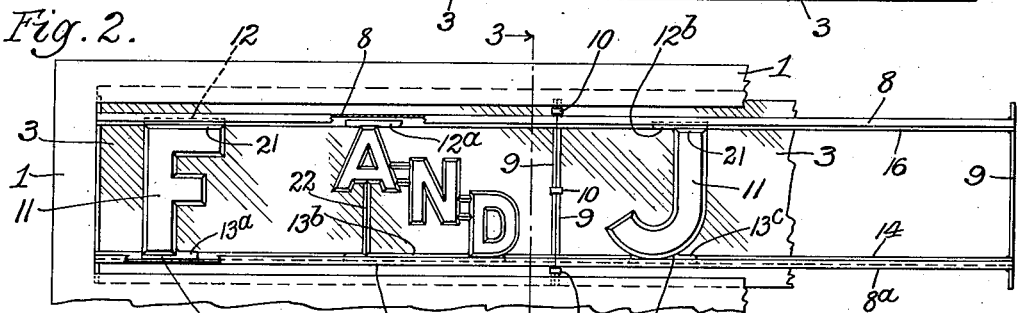
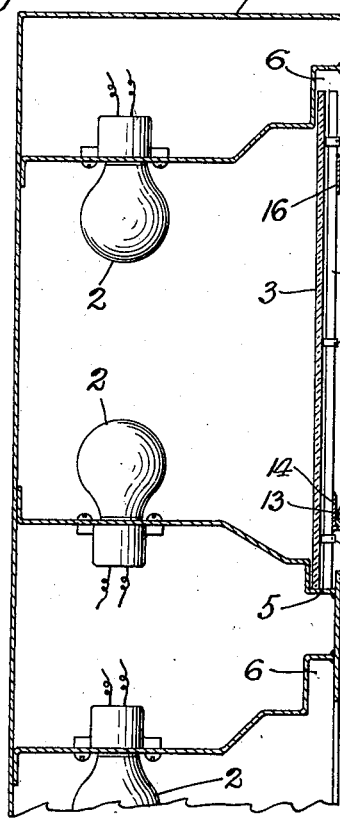
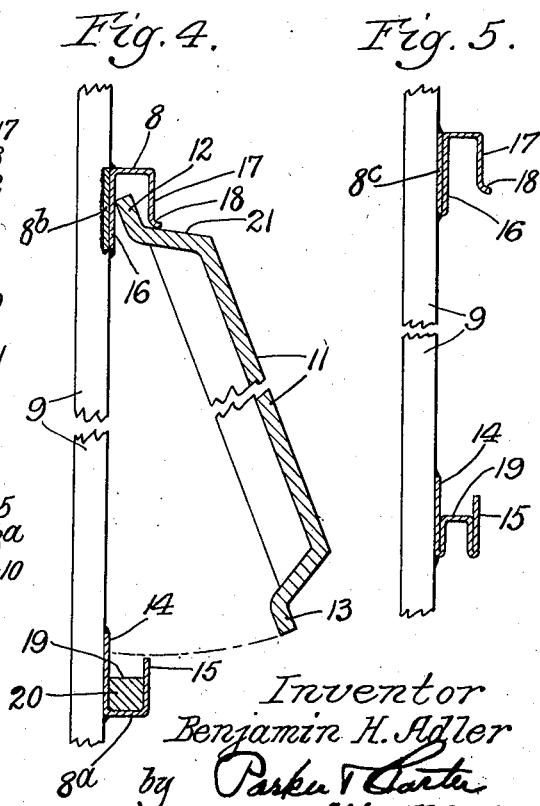
Inventor
Benjamin H. Adler
by Parker & Carter
Attorneys.

May 2, 1939. B. H. ADLER 2,156,257
CHANGEABLE SIGN AND LETTERS THEREFOR
Filed April 24, 1936 3 Sheets-Sheet 2
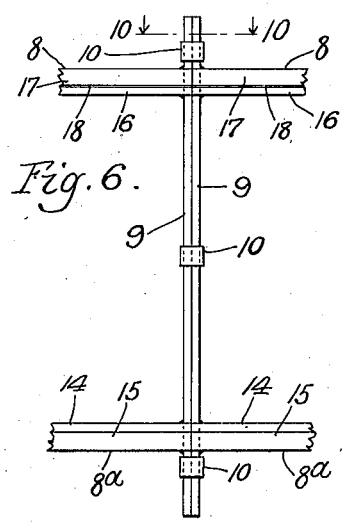
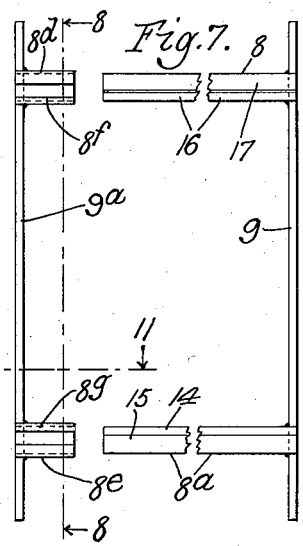
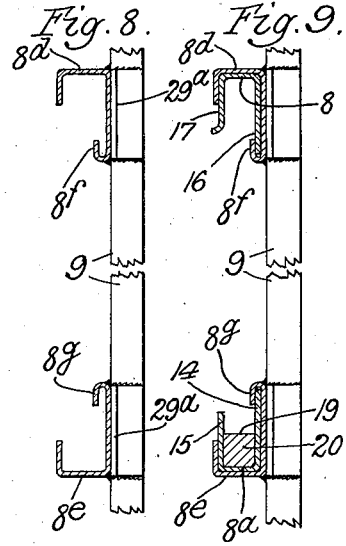
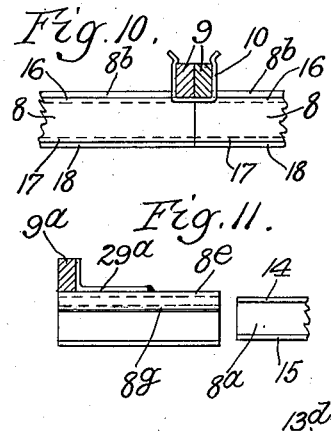
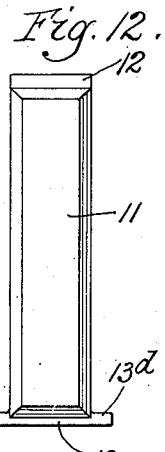
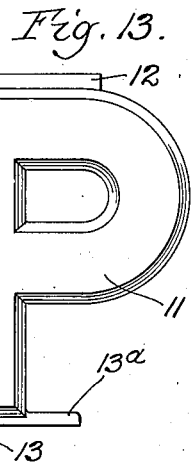
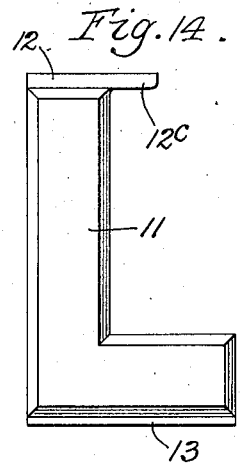
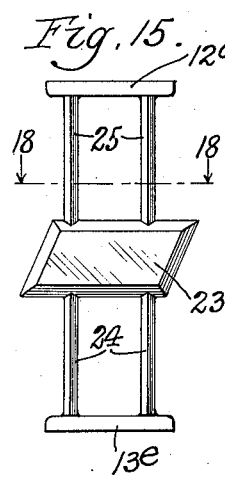
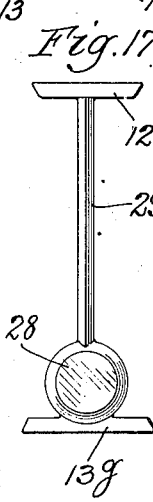
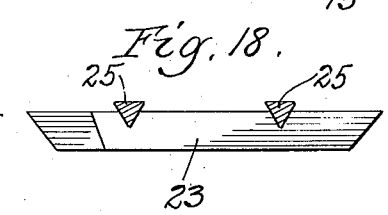
Inventor
Benjamin H. Adler
by Parker & Carter
Attorneys.

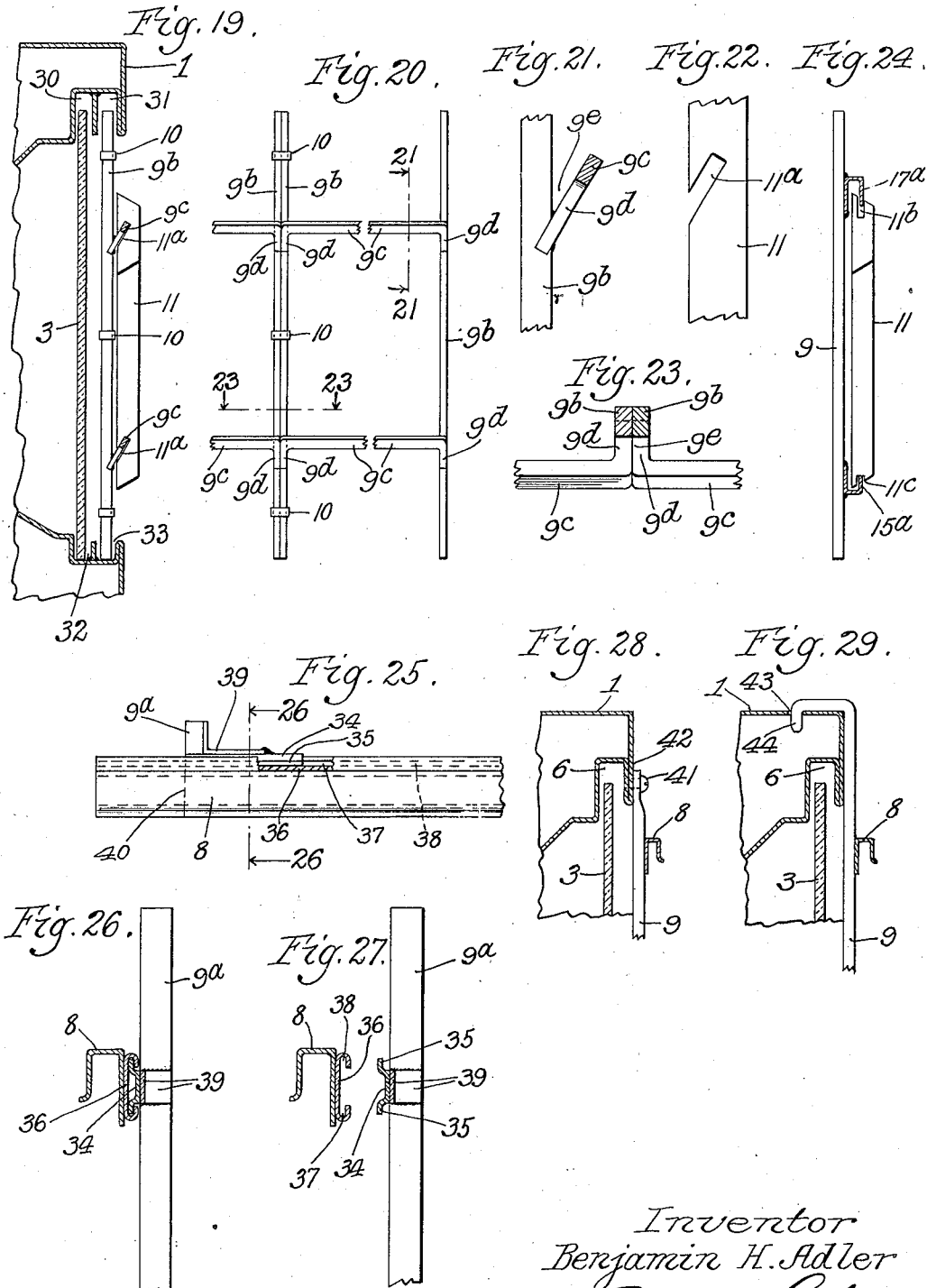

Patented May 2, 1939

2,156,257

UNITED STATES PATENT OFFICE 2,156,257

CHANGEABLE SIGN AND LETTERS THEREFOR

Benjamin H. Adler, Chicago, Ill.

Application April 24, 1936, Serial No. 76,231

8 Claims. (Cl. 40—140)

This invention relates to changeable signs and letters therefor and has for its object to provide a new and improved device of this description. The invention has as a further object to provide a device of the kind described wherein the letters can be easily and quickly inserted and removed and yet cannot be dislodged by the wind so that they will fall out.

The invention has as a further object to provide a device of the kind described wherein there is a letter supporting device made up of sections, with means for easily and quickly connecting the sections together. The invention has a further object to provide a construction wherein punctuation marks can be used with the letters and easily and quickly placed in position. The invention has as a further object to provide a device of the kind described wherein letters which are not full height can be utilized. The invention has other objects which are more particularly pointed out in the accompanying description.

Referring now to the drawings, Fig. 1 is a front view of one form of device embodying the invention, with parts omitted and parts broken away and without the letters in position;

Fig. 2 is an enlarged section of a portion of the device shown in Fig. 1, with certain letters in position;

Fig. 3 is an enlarged sectional view taken on line 3—3 of Fig. 2;

Fig. 4 is an enlarged sectional view showing a modified construction;

Fig. 5 is an enlarged sectional view showing a further modified construction;

Fig. 6 is an enlarged sectional view showing the two sections of the letter supporting device joined together;

Fig. 7 is a view with parts broken away, showing the adjustable means for the end section of the letter supporting device;

Fig. 8 is a sectional view taken on line 8—8 of Fig. 7;

Fig. 9 is a view similar to Fig. 8, when the adjustable end section is in position;

Fig. 10 is an enlarged sectional view taken on line 10—10 of Fig. 6;

Fig. 11 is an enlarged sectional view taken on line 11—11 of Fig. 7;

Fig. 12 is a view of the letter I;

Fig. 13 is a view of the letter P;

Fig. 14 is a view of the letter L;

Fig. 15 is a view showing a "dash";

Fig. 16 is a view showing quotation marks;

Fig. 17 is a view showing a period;

Fig. 18 is an enlarged sectional view taken on line 18—18 of Fig. 15;

Fig. 19 is a sectional view showing a further modified construction;

Fig. 20 is a view showing the letter supporting device of Fig. 19;

Fig. 21 is an enlarged sectional view taken on line 21—21 of Fig. 20;

Fig. 22 is an enlarged sectional view of a portion of the letter at the point where it is attached to the frame;

Fig. 23 is an enlarged sectional view taken on line 23—23 of Fig. 20;

Fig. 24 is a view showing a further modified construction;

Fig. 25 is a plan view with parts broken away, showing a modified construction of an end adjustable section;

Fig. 26 is a sectional view taken on line 26—26 of Fig. 25;

Fig. 27 is a view similar to Fig. 26 showing the parts separated.

Fig. 28 is a view showing a modified construction for supporting the letter supporting device; and Fig. 29 is a similar view showing a modified construction.

Like numerals refer to like parts throughout the several figures.

Referring now to the drawings, wherein I have shown a form of device embodying my invention, there is illustrated a frame 1 containing a series of lights 2. Mounted in the frame are a series of glass or equivalent panels 3, with their edges abutting at the lines 4. The panels 3 are supported in any desired manner, and as here shown have their upper and lower edges in channels 5 and 6. The glass panels 3 are of such height with relation to these channels that they can be easily inserted by lifting their upper edge up near the top of the channel 6 and moving their lower edge over the lip 7.

I prefer to provide a letter supporting device for the letters which consists of the cross or longitudinal members 8 and 8a and the upright members 9, which have their ends projecting above and below the longitudinal members. This letter supporting device is preferably made in sections and the upright members 9 of the adjacent sections are easily and quickly fastened together by means of the clips 10. These clips are preferably of spring metal and are placed on the adjacent upright members 9, as shown for example in Figs. 6 and 10. These clips hold the sections of the letter supporting device together and yet they can be easily and quickly removed so as to separate the sections. I prefer to locate the upright members so that they cover the lines 4 where the glass sections join. This is clearly illustrated in Fig. 1, wherein there is illustrated a sign having two rows of letters. In the lower row the letter supporting device and letters are omitted, showing the glass sections in position, and in the upper row the letter supporting device is in position, with the upright members 9 covering the cracks or lines between the glasses.

The construction of the longitudinal members 8 will depend upon the form of letter used. In Figs. 2, 3 and 4 I have illustrated a form of letter 11 having lugs 12 at the top and lugs 13 at the bottom. In this construction I prefer to form the longitudinal members 8 and 8a of channels so that the lugs may fit in these channels and thus the letter be held in place. In Fig. 3 I have illustrated the glass sections and the letter supporting device located in the same channels. I prefer to arrange the lower channel 8a so that the inner edge 14 projects above the outer edge 15. I also prefer to have the inner edge 16 of the upper channel project down farther than the outer edge 17. I also prefer to have the outer edge 17 provided with a rounded extremity 18. It is desirable to have the outer edges 15 and 17 of substantially the same height so as to have substantially the same appearance when the lights are in position and under these conditions, the bottom 19 of the lower channel must be raised above the bottom of the outer edge 15. In Fig. 4 I have shown this as being accomplished by inserting in the channel a filling member 20. In Fig. 5 I have shown this as being accomplished by bending the bottom of the lower channel upwardly. In Fig. 4 the upper longitudinal member 8 is provided with a separate reinforcing member 8b. In Fig. 5 I have shown this separate reinforcing member 8c as being integral with the channel and as being provided by a portion bent so as to be parallel to the rear edge 16 of the channel.

The letter supporting device is placed in position similar to the glass by moving the upright members so that their upper ends strike the top of the channel 6, and then moving the lower ends inwardly over the top of the edge 7 and letting them drop down on to the bottom of the channel 5. The letters illustrated in Figs. 2, 3 and 4, and which have the lugs 12 and 13, are placed in the channels of the letter supporting device in a similar manner by putting the upper lug 12 in the channel, as shown in Fig. 4, and then moving the lower end of the letter inwardly. During this process the curved extremity 18 of the edge 17 engages the beveled portion 21 of the letter, as shown in Fig. 4, thereby facilitating the movement of the letter into position. As the lower end of the letter moves inwardly the lug 13 passes over the top of the edge 15 and strikes the rear edge 14 and is stopped, and may then be released, whereby it drops down to the bottom 19 of the channel, as shown in Fig. 3. It will be seen therefore that it is impossible to move the lower end of the letter inwardly too far so that it will pass the rear edge 19 and fall out when released or so that it will strike the glass.

The lugs on the upper and lower ends of the letters and other parts must be of the proper length to prevent the letters from tilting and falling out. When the letter has a long horizontal portion at one or both ends, the lug if made substantially as long as the horizontal portion, will be of sufficient length, as for example the lug 12 on the letter F of Fig. 2. When the letter has a single narrow end portion, as does the letter F in Fig. 2, then I provide a laterally extending lug 13a, as shown at the bottom of the letter F in Fig. 2, this laterally extending lug being of sufficient length to prevent the letter from tilting and falling out. In order to prevent the letter from tilting so as to fall out, it is only necessary that the laterally projecting lug be of such length that when the letter starts to tilt, the lug will firmly engage the bottom of one of the channels, while the lug at the other end of the letter will engage the top of the other channel, thereby preventing any tilting movement of the letter.

When it is desired to use a series of small letters, as for example in the word "and" shown in Fig. 2, I connect the letters together in a diagonal manner, arranging the letter at one end, as for example the letter a, with a lug 12a which projects laterally on one or both sides of the top of the letter, and also providing a laterally projecting lug 13b on the last lettter, or the letter d said lug projecting toward the letter a by the connecting member 22. In placing the word in position in the sign, the lug 12a is inserted in the upper channel and the lower end 13b moved inwardly over the top of the outer edge 15, and then the letters released, whereupon they take the position shown in Fig. 2.

In certain letters, like the letter J see Fig. 2, it is desirable to have a laterally projecting lug 13c projecting in one direction at the bottom and a laterally projection lug 12b projecting in the opposite direction at the top of the letter, to secure the proper relation between the lugs to prevent the letter from tilting and falling out. In a letter such as the letter I, I prefer to provide a lug 12 at the top which may extend substantially along the width of the letter and at the bottom a lug 13d extending in a lateral direction, as illustrated in Fig. 12. The letter P, for example, would have a lug 12 at the top extending substantially across the letter and would have the laterally projecting lug 13a at the bottom. The letter L would have the laterally projecting lug 12c at the top and the lug 13 extending substantially across the bottom. The letters requiring some form of laterally projecting lug would usually be the letters A, F, I, J, L, O, P, T, V, etc.

In utilizing a "dash" 23 which must be located near the middle of the letters with which it is associated, I prefer to provide this dash with the downwardly projecting members 24 and the upwardly projecting members 25 which are provided with the upper lug 12d and the lower lug 13e. In using quotation marks 26, the upper ends of the quotation marks may be provided with the lugs 12f and to the lower part may be connected the downwardly extending members 27 provided with the lug 13f. In providing a period 28, the lower part of this period may be provided with the lug 13g and the period may be provided with the upstanding member 29, having at its upper end the lug 12g. It will thus be seen that the various punctuation marks can be provided and easily placed in position and removed as desired. The members 22, 24, 25, 27 and 29 preferably are triangular in cross section so that the outer faces will reflect the light and when viewed at a little distance will fade away and become invisible.

In order to adapt the letter supporting devices to signs of any desired length, they are, as heretofore stated, made up in sections. When the last section of the sign is shorter than the standard length section, as shown for example in Fig. 1, I provide the upright member 9a, see Fig. 7, with short longitudinal portions 8d and 8e, formed of channels arranged so that the channels 8 and 8a may be slid or telescoped into them. I prefer to provide a bracing member 29a for connecting the members 8d and 8e with the upright member 9a, see Fig. 11. With this construction, the longitudinal members 8 and 8a of the end section will be made up in lengths substantially equal to the standard section and then when the party assembling the sign is on the job, he can with a hand-saw, saw off the ends of these longitudinal members so as to make them the right length. He can then bring these ends in proximity to the portions 8d and 8e, see Fig. 7, and then slide them into or telescope them with the portions 8d and 8e, as shown for example in Fig. 9, and then fasten the parts together in any desired manner, as by clamping the looped edges 8f and 8g on the portions 14 and 16 of the channels, or friction alone may be sufficient. It of course can be fastened together in any other desired manner.

I prefer to provide the longitudinal portions 8d and 8e with the looped edges 8f and 8g, as shown in Fig. 9, so as to insure a rigid construction when the parts are assembled. It will thus be seen that signs of any desired length can be thus made up of the standard sections of the letter supporting device.

In Fig. 19 I have shown a modified construction where the frame 1 is provided at the top with the two channels 30 and 31 and at the bottom with the two channels 32 and 33. The glass 3 is in one channel and the letter supporting device in the other channel. In this construction the letter supporting device or frame is made up of the upright members 9b and the longitudinal members 9c. The longitudinal members are illustrated as flat members, having their ends 9d bent downwardly and connected to the upright members 9b, as shown in Figs. 20 and 21, the members 9c being thus firmly held in an inclined position. The letters 11 are provided with slots 11a and are slipped down over the longitudinal members 9c, as shown in Fig. 19. It will be noted that at the points where the longitudinal members 9c are connected with the upright members 9b, there is a space 9e so that the letters can be slid past the uprights when desired without removing them from the longitudinal members 9c. The longitudinal members 9c which enter the slots in the letters 11, it will be noted, are flat and since they are inclined, and the slots are inclined, the letters are firmly held in position and cannot be blown off by the wind.

In Fig. 24 I have shown a modified construction where the letters 11 are provided at their tops and bottoms with the slots 11b and 11c extending thereacross and the outer edges 15a and 17a fit into these slots. The upper slot 11b is made deeper than necessary so that the letter may be easily placed in position by moving it upwardly until the edge 17a strikes or approaches the bottom of the slot, and then moving the bottom of the letter inwardly and lowering it so that edge 15a enters the slot 11c, as shown in Fig. 24.

In Figs. 25, 26 and 27 I have shown a modified construction for the adjustable end section, which in fact is the preferred construction. In this construction one of the uprights 9a for the last letter supporting section is provided with an engaging part 34 having the edges 35 which are separated from the upright. The cross member 8 is provided with a cooperating engaging element 36 having the grooves 37 and 38, see Fig. 27. The lower cross member 8a will be provided with a similar construction and the upright 9a will have a similar engaging part 34 opposite the cross member 8a. I prefer to provide a strengthening member 39 which is shown in the form of an angle, see Figs. 25, 26 and 27, one part of which is attached to the upright 9a and the other parts attached to the engaging part 34.

In assembling the parts, the projections 35 are placed opposite the grooves 37 and 38 and then the cross members moved or slid therealong until the end upright member is in its proper position. The cross member 8 will then project beyond the upright member, as shown in Fig. 25, the distance which it projects depending upon the distance of the space to be occupied by the end section. After the parts have been adjustably connected as herein before set out, the cross member 8 is then cut the proper length by means of hack-saw or any other instrument, as for example on the dotted line 40, see Fig. 25. The other cross member 8a is cut off to the same length. Instead of having the engaging part 34 on the upright, it may be placed on the cross members 8 and 8a and the engaging member 36 may be placed on the upright member 9a, that is the parts may be reversed if desired. I prefer, however, to have the engaging part on the upright as it can be made comparatively short and the engaging part 36 being on the members 8 and 8a, can be made any length without inconvenience.

Instead of placing the letter supporting device in channels, I may fasten it in position in any desired manner. In Fig. 28 I have illustrated a construction where the members of the letter supporting device are fastened by the fastening devices 41 to the portion 42 of the frame 1. These fastening devices may be screws so that they may be easily removed or may be rivets or any other fastening devices. In Fig. 29 I have shown a construction where the frame is provided with openings 43 in proper position and the upright members 9 are provided with bent ends 44 which may be inserted in said openings so as to hold the frame in position.

I have herein shown and described a particular construction, but it is of course evident that the parts may be varied in many particulars and some parts omitted and others used with parts not here shown without departing from the spirit of the invention as embodied in the claims hereto appended, and I therefore do not limit myself to the construction shown.

I claim:

1. A changeable sign comprising a frame, a plurality of glass sections therein with their edges abutting, a letter supporting device having longitudinal members and upright members upon which the letters are supported, said letter supporting device separate from the glass and separably removable, the upright members when in position covering the crack between the sections of the glass so as to conceal such crack and prevent light from passing outwardly therethrough, the letters when in position being separated by spaces through which the glass is visible.

2. A changeable sign comprising a frame, a glass therein, a light behind said glass, said frame provided with upper and lower channels, a letter supporting device connected with said frame and having longitudinal members and upright members, the longitudinal members formed of channels, a letter having lugs at both ends, the lug at one end being a laterally projecting lug projecting laterally beyond the portion of the letter with which it is connected, so as to engage the channel and prevent the letter from tilting so as to become displaced the lug on the upper end of the letter being of a greater height than the lug on the lower end of the letter so that the letter may be inserted from the front into the channels of the letter supporting device.

3. A changeable sign comprising a frame, a glass therein, a light behind said glass, separated channels associated with said frame, with their open edges facing each other, said channels having front and rear walls between which the letters are received, a letter having lugs at both ends located at one side of the longitudinal plane extending through the center of the letter, which fit into said channels, the space between the bottom of the lower channel and the topmost part of the upper channel being greater than the distance between the top of the upper lug and the bottom of the lower lug on said letter, so that the letter may be inserted from the front into said channels, the lug at one end being a laterally projecting lug which projects laterally beyond the portion of the letter with which it is connected, so as to engage the channel and prevent the letter from tilting so as to become displaced.

4. A changeable sign comprising a frame, a glass therein, a light behind said glass, a letter supporting device having a plurality of sections, each consisting of longitudinal members and upright members, the longitudinal members of the end section being slidably connected with an upright member, so that the end section can be adjusted to any desired length.

5. A changeable sign comprising a letter supporting device having a plurality of sections, each consisting of longitudinal members and upright members, the longitudinal members of the end section being adjustably connected with one of the upright members so that the end section may be varied in length to fit spaces of various lengths.

6. A changeable sign comprising a frame, a glass therein, a light behind said glass, a letter supporting device having separated channels with their open edges facing each other, a punctuation mark having a lug at one end and an upright member connected therewith, with a lug at the end of the upright member, said lugs fitting into said channels and engaging them, to prevent the punctuation mark from tilting so as to be displaced.

7. A device of the kind described comprising a letter having beveled upper and lower edges, lugs at both ends formed by extending the beveled edges beyond the boundaries of the letter, the lug at one end projecting laterally beyond that portion of the letter with which it is connected, the lug at the other end being within the boundaries of the adjacent part of the letter at that end, said laterally projecting lug cooperating with the lug at the other end of the letter, to prevent the letter from tilting so as to be displaced.

8. A changeable sign comprising a frame, a letter supporting device carried thereby having a plurality of sections provided with vertically extending members and longitudinal channel shaped members upon which the letters are suspended, the channels of the end sections and the adjacent sections slidably mounted one within the other, so that they may be moved relatively to vary the distance between the end vertical member and the adjacent vertical member so that the letter supporting device may be inserted in a space less in length than the length of a plurality of full length sections.

BENJAMIN H. ADLER.